(12) United States Patent
Irion et al.

(10) Patent No.: US 6,786,727 B2
(45) Date of Patent: Sep. 7, 2004

(54) SIMULATOR APPARATUS WITH AT LEAST TWO DEGREES OF FREEDOM OF MOVEMENT FOR AN INSTRUMENT

(75) Inventors: Klaus M. Irion, Liptingen (DE); Ralph Boehm, Bodman-Ludwigshafen (DE); Stefan Kolberg, Friedberg-Bachern (DE); Thomas Viebach, Pischertshofen (DE)

(73) Assignee: Karl Storz GmbH & Co. KG (DE)

( * ) Notice: Subject to any disclaimer, the term of this patent is extended or adjusted under 35 U.S.C. 154(b) by 0 days.

(21) Appl. No.: 10/428,382

(22) Filed: May 2, 2003

(65) Prior Publication Data

US 2004/0024418 A1 Feb. 5, 2004

Related U.S. Application Data

(63) Continuation of application No. PCT/EP01/12658, filed on Oct. 31, 2001.

(30) Foreign Application Priority Data

Nov. 3, 2000 (DE) .......................................... 100 55 294

(51) Int. Cl.[7] .............................................. G09B 19/16
(52) U.S. Cl. ....................................................... 434/55
(58) Field of Search .............................. 434/29, 55, 59, 434/58, 61, 62, 63, 67; 472/44, 46, 47, 59

(56) References Cited

U.S. PATENT DOCUMENTS

| | | | | |
|---|---|---|---|---|
| 4,908,558 A | * | 3/1990 | Lordo et al. ................ | 318/648 |
| 5,006,072 A | * | 4/1991 | Letovsky et al. ............ | 434/61 |
| 5,060,932 A | * | 10/1991 | Yamaguchi .................. | 472/47 |
| 5,752,834 A | * | 5/1998 | Ling ........................... | 434/58 |
| 5,901,936 A | * | 5/1999 | Bieg ........................... | 248/370 |
| 6,024,576 A | | 2/2000 | Bevirt et al. ................ | 434/262 |
| 6,077,078 A | * | 6/2000 | Alet et al. ................... | 434/55 |
| 6,402,625 B2 | * | 6/2002 | Armstrong ................... | 472/59 |
| 6,445,960 B1 | * | 9/2002 | Borta .......................... | 700/28 |

FOREIGN PATENT DOCUMENTS

| | | |
|---|---|---|
| DE | 100 55 294 C2 | 10/2002 |
| EP | 0 970 662 A1 | 4/1999 |
| WO | WO 96/30885 | 10/1996 |
| WO | WO 97/19440 | 5/1997 |
| WO | WO 01/54587 A1 | 8/2001 |

OTHER PUBLICATIONS

Bio Medical Journal Nr. 51, Von U. Kühnapfel, "Ein Virtual–Reality Trainingssystem fürr die Laparoskopie", Apr. 1998, pp. 4–7.

* cited by examiner

Primary Examiner—Kurt Fernstrom
(74) Attorney, Agent, or Firm—St. Onge Steward Johnston & Reens LLC

(57) ABSTRACT

A simulator apparatus with at least two degrees of freedom of movement for an instrument which has an elongated shaft, has a holding device for the instrument, the holding device being designed such that the instrument has at least a first degree of freedom of rotary movement about the longitudinal axis of the shaft and at least a second degree of freedom of translatory movement in the direction of the shaft. The holding device has a gear arrangement for the first and second degrees of freedom, which has a first bevel gear, which is connected to the shaft and corotates with the latter about the longitudinal axis thereof, and has a second and a third bevel gear which are arranged on either side of the first bevel gear and are in rolling engagement therewith.

14 Claims, 6 Drawing Sheets

SIMULATOR APPARATUS WITH AT LEAST TWO DEGREES OF FREEDOM OF MOVEMENT FOR AN INSTRUMENT

CROSS-REFERENCE TO PENDING APPLICATIONS

The present application is a continuation of pending international patent application PCT/EP01/12658 filed on Oct. 31, 2001 which designates the United States, and which claims priority of German patent application DE 100 55 294.3 filed on Nov. 3, 2000.

BACKGROUND OF THE INVENTION

The invention relates to a simulator apparatus with at least two degrees of freedom of movement for an instrument that has an elongated shaft, comprising a holding device for the instrument, the holding device being designed such that the instrument has at least a first degree of freedom of rotary movement about a longitudinal axis of the shaft and at least a second degree of freedom of translatory movement in the direction of the shaft, the holding device having a gear arrangement for the first and second degrees of freedom.

Such a simulator apparatus is known from EP-A-0 970 662.

In general, such a simulator apparatus is used as interface between an operator and an instrument in simulators. A specific use, to which the following description relates without limiting the present invention thereto, is the integration of a simulator apparatus mentioned at the beginning in a simulator for simulating a minimally invasive surgical intervention in a human or animal body.

The term "instrument" is to be understood generally in the sense of the present invention, and in the case of a medical simulation, it can be an endoscope, a tool such as scissors, forceps, a dissector, clamp applicator etc.

In recent years, minimally invasive surgery has gained clearly in importance by comparison with open surgery. In minimally invasive surgery, a viewing system, for example an endoscope, and one or more instruments such as forceps, scissors, HF instruments, clamp applicators, etc. are introduced into the body by minimal incisions. The minimally invasive surgical operation is carried out with video assistance with the aid of the abovementioned instruments in combination with peripheral devices.

At present, minimally invasive surgery is used, for example, for removing a gall bladder, the appendix and for handling herniotomies. Further fields of use are being opened up.

However, "minimally invasive" surgery covers as a term not only surgical interventions, but also interventions such as, for example, the introduction of substances into the body, or biopsies where use is made of the minimally invasive technique.

By contrast with open surgery, the advantage of the minimally invasive technique resides in the mode of procedure, which spares the patient and entails less surgical trauma, shorter times of stay in hospitals and a shorter incapability for work.

By contrast with open surgery, however, the handling of the instruments during a surgical intervention is substantially more complicated, firstly because the freedom of movement of the instrument inserted through the incision is restricted because of the only small incision, and secondly because the surgeon does not himself have a clear dimensional view of the working tip of the instrument located in the body, nor of the operating site, but instead only a two-dimensional visual monitoring is possible via the video monitor. It goes without saying that the coordination of the guidance and operation of the instrument or instruments are thereby rendered more difficult.

There is thus a greater need for training in the new techniques of minimally invasive surgery. Various alternatives currently exist for training in surgical procedures of minimally invasive surgery.

One alternative consists in carrying out training operations in vivo on animals, specifically on pigs. However, such training is cost intensive, time consuming to prepare and, moreover, ethically dubious.

In the case of a further alternative, physicians are trained on in vitro organs in a training box into which the instruments can be appropriately introduced. The organs arranged in the training box are certainly biological organs, but training in the case of this alternative is likewise time consuming to prepare and cannot be regarded as realistic.

Finally, training in minimal invasive surgery is currently being carried out on model organs or training objects in a training box. However, such model organs are not sufficiently realistic for training for an entire operation. Moreover, the preparation of the model organs and training objects requires a not inconsiderable preparatory outlay, since the models are for the most part destroyed during the operation and initially require to be prepared again for further training sessions.

Because of the disadvantages of the training systems used to date, there was already a need very early for so called virtual simulators that can be used to overcome the disadvantages of the previous training systems.

The actual operating site is generated exclusively via a computer in the case of virtual simulation. Realistic simulation requires a model database that fixes the geometric shapes and physical properties of the tissues, organs and vessels, as well as the geometry and kinematics of the instrument or instruments. In the journal "Biomedical Journal", Volume No. 51, April 1998, U. Kühnapfel describes a "Virtual-Reality-Trainingssystem für die Laparoskopie" ["Virtual reality laparoscopy training system"] that has an input box which exhibits from the outside the customary instrument grips and a virtual endoscope. In the housing, the minimally invasive instruments are guided in a mechanical guide system that further permits the detection of the deflection of the instruments and actuators. In addition, various foot switches are present that can be used to activate surgical and general functions. Via angle encoders, for example, a PC-based sensor data acquisition process measures the positions of the joints of the operating instruments and transmits these continuously to a graphics workstation. A "virtual" image of the endoscope view is calculated there from in real time. The consistency of the tissue to be treated is fed back to the operator realistically as force feedback by inherently calculated "virtual" reactive forces between organs and instruments.

Consequently, in the case of virtual simulation of minimally invasive interventions, no use is made of physically present organs—instead the spatial and physiological structures of such organs are present as data in a computer. The simulator apparatus mentioned at the beginning in this case forms the interface between the operator and the instrument to be handled and the simulation computer system. The operator to be trained handles the instrument accommodated in the mechatronic simulator apparatus, the data stored in the computer, for the spatial and physiological structure of the virtual organ being transmitted as force feedback by the simulator apparatus to the instrument while the latter is being handled, as a result of which the operator is afforded a realistic feel.

The previous developments in this field have concentrated primarily on the creation of the simulation software, while so far available holding systems capable of localization have been used as mechatronic simulator apparatus. In the interests of realistic simulation, the simulator apparatus should take account of all degrees of freedom that are present for a minimally invasive surgical instrument, specifically a tilting of the instrument about the surface of the body, a movement in the direction of the shaft and a rotary movement about the longitudinal axis of the shaft. However, a problem in this is the mechanical implementation of these many degrees of freedom in the holding device of the simulator apparatus for the instrument.

For example, the simulator apparatus known from U.S. Pat. No. 6,024,576 comprises a complicated mechanical lever system whose disadvantage resides particularly in the fact that the simulator apparatus is very large overall. It is therefore impossible using such a simulator apparatus for two or more apparatuses to bring a plurality of instruments so close together that the instrument tips can touch. Because of the many levers used in this known simulator apparatus, undesirable moments of inertia and torques occur when this simulator apparatus is being used and must be compensated in a complicated way in order to permit a realistic force feedback.

The simulator apparatus known from EP-A-0 970 662 mentioned at the beginning is used in a surgical simulator system that simulates the placing of a catheter into blood vessels. This known simulator system ensures a haptic force feedback to the user of a set of catheters or similar tubular objects that are coupled to the system. An actuator arrangement is coupled to the objects and likewise to a computer station that carries out a surgical procedure with the aid of a simulation program. The actuator arrangement has a set of mutually spaced actuators, each actuator being coupled mechanically to a corresponding object by means of a rigid tube that is used as an extension of the object inside the actuator arrangement. Each actuator of the arrangement comprises sensors generating signals that indicate an axial translatory movement and a rotary movement of the object by the user. The signals detected are transmitted to the computer. The computer calculates as a response to these signals axial forces and torques that must be exerted on the object as haptic force feedback, and generates drive signals for the actuator arrangement. Each of the actuators has a gear arrangement that is connected via supports and holders to the rigid tube or to the simulating catheter. However, the configuration of this gear arrangement disadvantageously leads to a higher moment of inertia for the actuator itself. This has the disadvantage that the user of the simulator apparatus already senses a force feedback because of the high moments of inertia of the actuator even when this feedback does not normally occur for the purpose of the catheter movement being simulated. Again, the known actuators have a very large overall size.

Furthermore, WO 96/30885 discloses a virtual surgery system that makes use as input apparatus of a mouse, a joystick, a three-dimensional mouse or a seven-dimensional joystick. The disadvantage with this type of simulation apparatus consists in that the input apparatus, for example the mouse or the joystick, does not permit realistic simulation of the use of a surgical instrument, for example forceps.

It is therefore the object of the invention to specify a simulator apparatus of the type mentioned at the beginning that has a compact design and mechanics of low torque.

SUMMARY OF THE INVENTION

According to the invention, a simulator apparatus with at least two degrees of freedom of movement for an instrument that has an elongated shaft defining a longitudinal axis, is provided, said simulator apparatus comprising: a holding device for said instrument, said holding device being designed such that said instrument has at least a first degree of freedom of rotary movement about said longitudinal axis of said shaft and at least a second degree of freedom of translatory movement in the direction of said longitudinal axis of said shaft, said holding device having a gear arrangement for said first and second degrees of freedom, wherein said gear arrangement has a first bevel gear, which is connected to said shaft and corotates with the latter about said longitudinal axis thereof, and has a second and a third bevel gear which are arranged on either side of said first bevel gear and are in rolling engagement therewith.

The simulator apparatus according to the invention therefore has a gear arrangement that resembles a differential gear and has the advantage that it can be arranged around the shaft of the instrument and is of particularly small overall size, and in particular large radii of movement of the moving parts such as in the case of the known lever arrangements are avoided. Guiding of the instrument in the holding device with particularly low torque is thereby also achieved. Such a gear arrangement can be used both to implement the first degree of freedom of the rotary movement about the longitudinal axis of the shaft and the second degree of freedom of the translatory movement in the direction of the shaft with a force feedback as is additionally provided in a preferred refinement, and also a superimposition of the two movements is rendered possible with low torque by the gear arrangement provided according to the invention. Moreover, the gear arrangement with three bevel gears has the advantage that the actuators, for example electric motors, possibly present for a force feedback, can be arranged immovably in the simulator apparatus, the result being to avoid further moments of inertia and torques, and to avoid a greater space requirement for the movement of such motors.

In a preferred refinement, the first bevel gear is in rolling engagement with the shaft via one or more pinions with the aid of a tooth system extending along the shaft.

A transfer of a translatory movement of the shaft along its longitudinal axis onto the first bevel gear is effected with particularly low torque by means of this measure. In the case of such a longitudinal movement of the shaft, the first bevel gear is set rotating about its longitudinal axis, and this thereby sets the second and the third bevel gears in rotary movements of mutually opposite direction. Force feedback to the first degree of freedom can therefore be implemented with particular ease by providing the second and third bevel gears, which are retarded by one or more actuators, as in a further preferred refinement. In order to achieve force feedback to the degree of freedom of the translatory movement, the second and the third bevel gears are then driven in opposite directions with the same torque and at the same speed.

However, the same actuators can also be used to achieve force feedback to the degree of freedom of the rotary movement of the shaft about its longitudinal axis. Specifically, as already mentioned when the instrument is being rotated about its longitudinal axis the first bevel gear is also corotated about the longitudinal axis of the shaft and, in the process, this sets the second and the third bevel gears in rotary movements in the same direction. In order to achieve force feedback to the degree of freedom of the rotary movement of the shank about its longitudinal axis, the actuators must therefore retard the second and the third bevel gears in the same direction and with the same torque.

In a further preferred refinement, the second and the third bevel gears are arranged concentrically with the shaft.

This arrangement of the second and third bevel gears results in a particularly space saving design, of small overall size, of the gear arrangement and of the overall arrangement of shaft and gear arrangement.

In a further preferred refinement, the holding device further has a cardanic suspension such that the instrument has a third degree of freedom of a swiveling movement about a first swivel axis, and a fourth degree of freedom of a swiveling movement about a second swivel axis, running perpendicular to the first swivel axis.

In the case of real surgery, a surgical instrument can usually be swiveled about the plane of the body surface about two mutually perpendicular axes that intersect in the incision. With the previously mentioned refinement, the simulator apparatus according to the invention therefore also permits realistic simulation of such movements of an instrument. The simulator apparatus according to the invention therefore permits at least four degrees of freedom of movement for the instrument. A cardanic suspension has, moreover, the advantage of a compact design occupying little space such that this measure for the purpose of the object on which the invention is based constitutes a further contribution to achieving this object.

In a further preferred refinement, the cardanic suspension is formed by a bow-shaped element that can be swiveled about the first swivel axis, and an annular element that can swivel about the second swivel axis, the instrument being guided on the bow-shaped element.

This refinement implements a cardanic suspension that is of particularly simple design and has the further advantage that the gear arrangement provided according to the invention for the first and second degrees of freedom can be arranged in a space saving fashion in the arrangement composed of a bow-shaped element and the annular element. Moreover, in the case when these two degrees of freedom are provided with force feedback, as a result of this arrangement the corresponding actuators need not, in turn, also be moved.

In a further preferred refinement, there are fastened on the annular element two mutually opposite seats, arranged offset by approximately 90° with reference to the second swivel axis, for a spherical element through which the shaft is passed through, the spherical element in the seats being held such that it can rotate relative to the seats about an axis of rotation passing through both seats, and such that it is immobile with reference to the seat perpendicular to this axis of rotation.

By means of this measure, in which the cardanic suspension has a spherical element for holding the instrument, the advantage is created that the spherical element forms a particularly space saving mechanical connection between the instrument and the bow-shaped element, forming the cardanic suspension, and the annular element. Moreover, the interior of the spherical element can be used for force feedback with particular effectiveness to hold the gear arrangement provided according to the invention, together with the actuators thereof.

Consequently, it is provided in a further preferred measure that the gear arrangement is arranged in the spherical element, a particularly space saving design of the entire simulator apparatus thereby being achieved despite the at least four possible degrees of freedom of movement of the instrument.

In a further preferred refinement, at least one actuator is provided in each case for the force feedback to the third and fourth degrees of freedom.

Owing to this measure, the third and the fourth degrees of freedom can also be simulated realistically with force feedback as it occurs in the case of a real handling of the instrument during an operation. It also holds, in turn, with regard to the motors provided for force feedback to the third and fourth degrees of freedom that these motors need not also be moved during the movement of the instrument in the simulator apparatus, and this is rendered possible by the cardanic suspension.

In a further preferred refinement, in each case one-position detection sensor is provided for determining the position of the instrument for at least one degree of freedom, preferably for all degrees of freedom.

The instantaneous values of all degrees of freedom of the instrument which are rendered possible by the simulator apparatus according to the invention can be detected in real time with the aid of such position detection sensors, and can be used, in turn, to generate signals for the force feedback in real time in a computer by appropriate signal processing.

In a further preferred refinement, the instrument has a moveable operating device, and the moveable operating device is equipped with force feedback.

Particularly when the instrument is not an endoscope, but a surgical instrument such as forceps or scissors, this measure has the advantage that the simulator apparatus according to the invention can also simulate the force resistances occurring during the real preparation, for example cutting or grasping, of tissue. In the simplest case, it is possible to attach to the moveable operating device a Bowden cable that is connected to an actuator which, in turn, receives control signals from the simulation computer system. With the refinement mentioned previously, the simulator apparatus according to the invention even has five degrees of freedom for the simulation.

In a preferred use of the simulator apparatus, the latter is used to simulate a minimally invasive operation on the human or animal body.

Further features and advantages emerge from the following description and the attached drawing.

It goes without saying that the features mentioned above and those still to be explained below can be used not only in the respectively specified combination, but also in other combinations or on their own, without departing from the scope of the present invention.

BRIEF DESCRIPTION OF THE DRAWINGS

An exemplary embodiment of the invention is illustrated in the drawings and will be described in more detail hereafter with reference thereto. In the drawings.

DETAILED DESCRIPTION OF A PREFERRED EMBODIMENT

Figure 1:
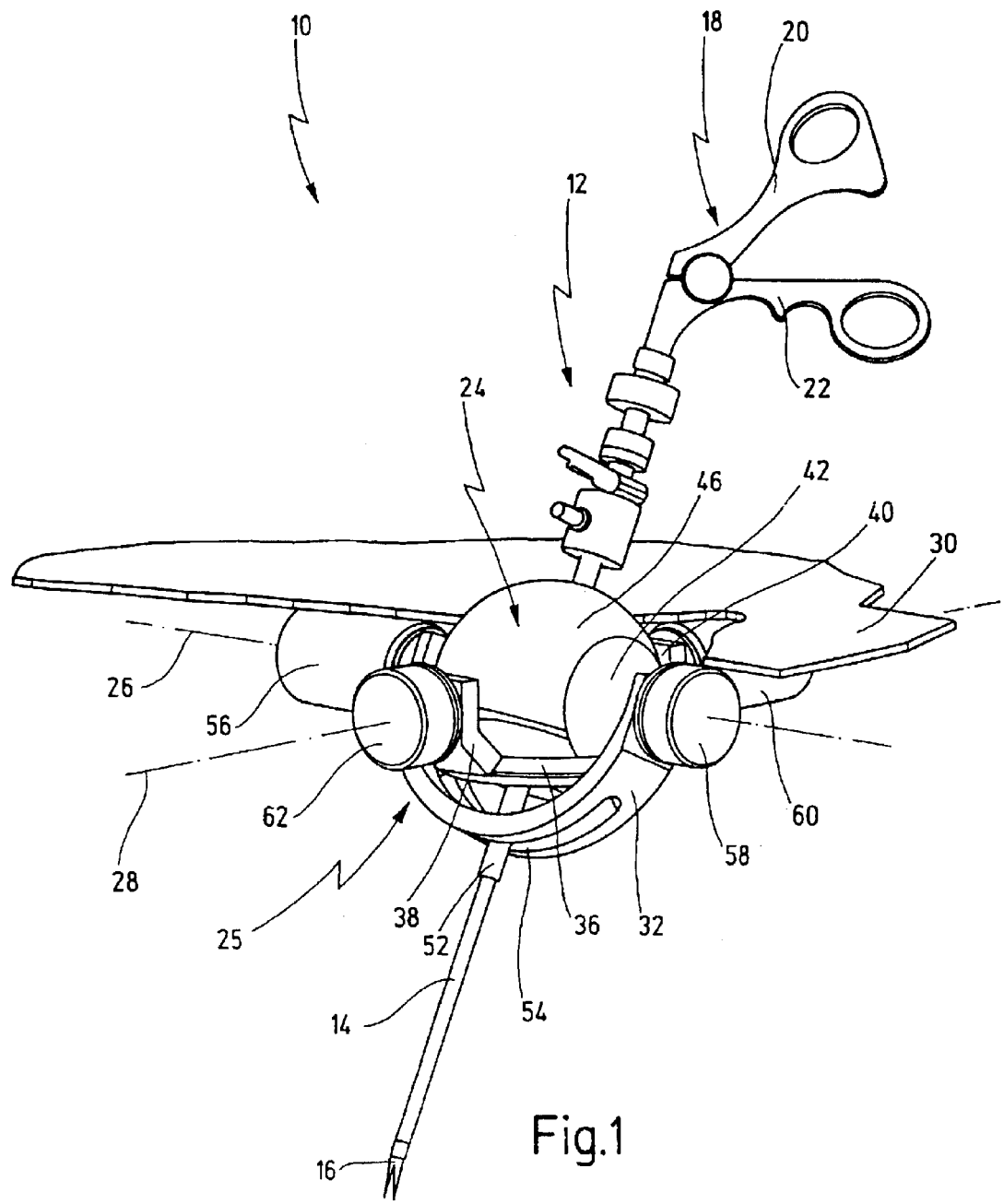
FIG. 1 shows an overall perspective illustration of a mechatronic simulation apparatus for simulating at least two degrees of freedom of movement of an instrument with force feedback.

A simulator apparatus, provided with the general reference 10, for simulating at least two degrees of freedom of movement of an instrument 12 is illustrated in FIGS. 1 to 5.

The simulator apparatus 10 is used, in particular, to simulate minimally invasive surgical operations on the human or animal body for the purpose of training physicians.

The instrument 12 is a pair of preparation forceps for cutting tissue in the exemplary embodiment shown. Instead of such preparation forceps, it is also possible, however, for an endoscope to be inserted as instrument 12 into the simulator apparatus 10, or it is possible to insert other tools such as clamp applicators, suction and irrigation instruments and the like into the simulator apparatus 10. The instrument 12 can be removed from the simulator apparatus for the purpose of changing instruments.

The instrument 12 has, in general, an elongated shaft 14 that is passed through the simulator apparatus 10 or is accommodated therein, a tool 16 at the distal end of the shaft which, in the present exemplary embodiment, has two jaw parts, for example provided with cutting edges, and an operating device 18 at the proximal end of the shaft 14. The operating device 18 has a moveable grip part 20 and an immovable grip part 22.

The simulator apparatus 10 has a holding device 24, which will be explained in more detail below.

The holding device 24 has a cardanic suspension 25. The cardanic suspension 25 permits the simulation of a degree of freedom of a swiveling movement of the instrument 12 about a first swivel axis 26, as well as of a further degree of freedom of a swiveling movement of the instrument 12 about a second swivel axis 28, running perpendicular to the first swivel axis 26. With the aid of these two degrees of freedom, it is possible to simulate any desired tilted positions of the instrument 12 with reference to a surface 30, which simulates the body surface of a patient in the case of a use of the simulator apparatus 10 to simulate minimally invasive operations on the human or animal body. The point of intersection between the swivel axes 26 and 28, which lies at a point on the longitudinal axis of the shaft 14, constitutes the invariant point of the swiveling movements of the instrument 12. Since in the case of real minimally invasive surgery the instrument is guided through an incision in the body surface, and the invariant point lies approximately in the incision, the arrangement of the swivel axes 26 and 28 is made in the case of the simulator apparatus 10 such that the point of intersection lies approximately at the level of the surface 30 or slightly there below.

In order to implement the swivel axis 26 of the cardanic suspension 25, the cardanic suspension 25 has a bow-shaped element 32 that is designed approximately in a shape of a semicircle. The bow-shaped element 32 is mounted swivelably about the swivel axis 26 on a mounting frame 34 (FIGS. 4 and 5) which is itself immovable.

In order to implement the swivel axis 28, the cardanic suspension 25 has an annular element 36 that is arranged inside the bow-shaped element 32. The annular element 36 is suspended such that it can swivel about the second swivel axis 28 by means of mounting angles 38 and 40.

Furthermore, there are fastened to the annular element 36 two mutually opposite seats 42 and 44 that are arranged offset by approximately 90° with reference to the second swivel axis 28. The seats 42 and 44 are designed as spherical shell segments and accommodate a spherical element 46.

The shaft 14 of the instrument 12 is accommodated in the spherical element 46 and goes through the latter, as will be explained in more detail later.

The spherical element 46 is mounted in the seats 42 and 44 by means of two pins 48 and 50 (indicated by broken lines) that engage in corresponding bores in the spherical element 46. The spherical element 46 can thus be rotated relative to the seats 42 and 44 about an axis of rotation 52 defined by the pins 48 and 50, but is immovable with reference to the seats 42 and 44 at right angles to this axis of rotation 52. Overall, the spherical element 46 can be moved relative to the bow-shaped element 32, and also relative to the annular element 36.

The shaft of the instrument 14 is guided only in the bow-shaped element 32, but not in the annular element 36. For this purpose, the shaft 14 is guided in the bow-shaped element 32 via a sleeve 52 that projects through an elongated hole 54 formed in the bow-shaped element 32. The shaft 14 can move together with the sleeve 52 in the longitudinal direction of the elongated hole 54 when the instrument 12 is swiveled about the second swivel axis 28.

Both the degree of freedom of the swiveling movement about the first swivel axis 26 and the degree of freedom of the swiveling movement about the second swivel axis 28 are provided in each case with force feedback.

An actuator, for example a DC motor for force feedback to the bow-shaped element 32, is arranged for the bow-shaped element 32, which element 32 can be swiveled about the first swivel axis 26. A position detection sensor 58, for example in the form of a potentiometer or an incremental rotary encoder, is arranged opposite the actuator 52 for the purpose of detecting position, that is to say for determining the angle of the angular position of the bow-shaped element 32.

Correspondingly, as force feedback for the degree of freedom of the swiveling movement about the second swivel axis 28 a further actuator 60 is connected to the annular element 36 via the mounting angle 40, and a position detection sensor 62 is connected via the mounting angle 38.

The mode of operation of the cardanic suspension 25 without and with force feedback is therefore as follows. An operator, for example a physician to be trained, takes hold of the operating device 18 of the instrument 12 in one hand. By moving the operating device 18, the instrument 12 can now be tilted in arbitrary solid angle directions about the plane 30 about the invariant point formed by the point of intersection of the first swivel axis 26 with the second swivel axis 28. This is illustrated by way of example in FIGS. 1 to 3 with the aid of various tilted positions.

From the tilted position in FIG. 1, the instrument 12 was tilted about the second swivel axis 28, while the swivel position remains unchanged with reference to the first swivel axis 26. In the event of this movement, the annular element 36 has been tilted correspondingly about the second swivel axis 28, while the spherical element 46 has changed its position relative to the bow-shaped element 32, but not relative to the annular element 36. In the drawing, the sleeve 52 with the shaft 14 has been moved correspondingly to the right in the elongated hole 54 of the bow-shaped element 32.

Figure 2:
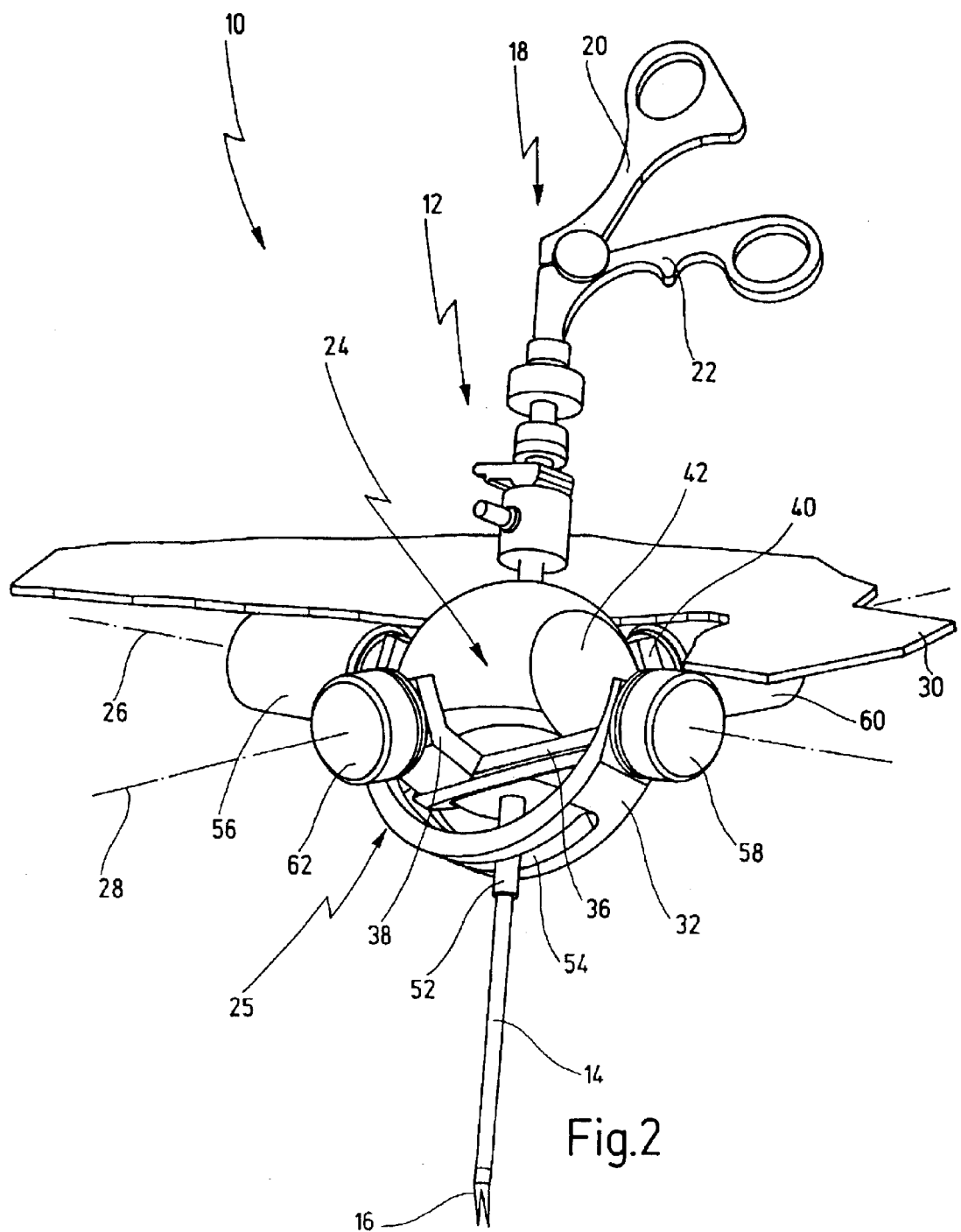
FIG. 2 shows the simulator arrangement in FIG. 1 in an operating position changed from FIG. 1.
Figure 3:
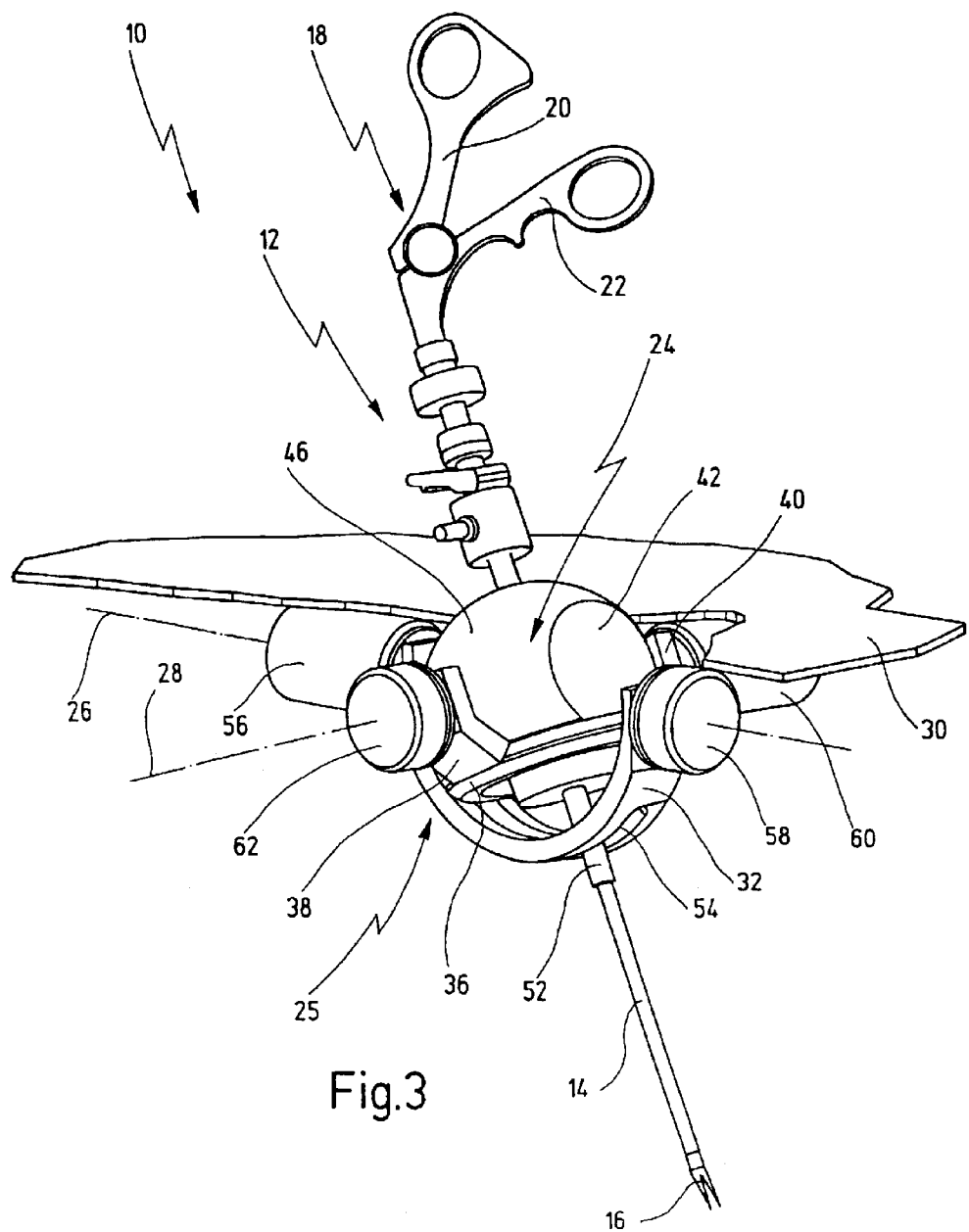
FIG. 3 shows the simulator apparatus in FIGS. 1 and 2 in a further operating position changed from FIGS. 1 and 2.
Figure 4:
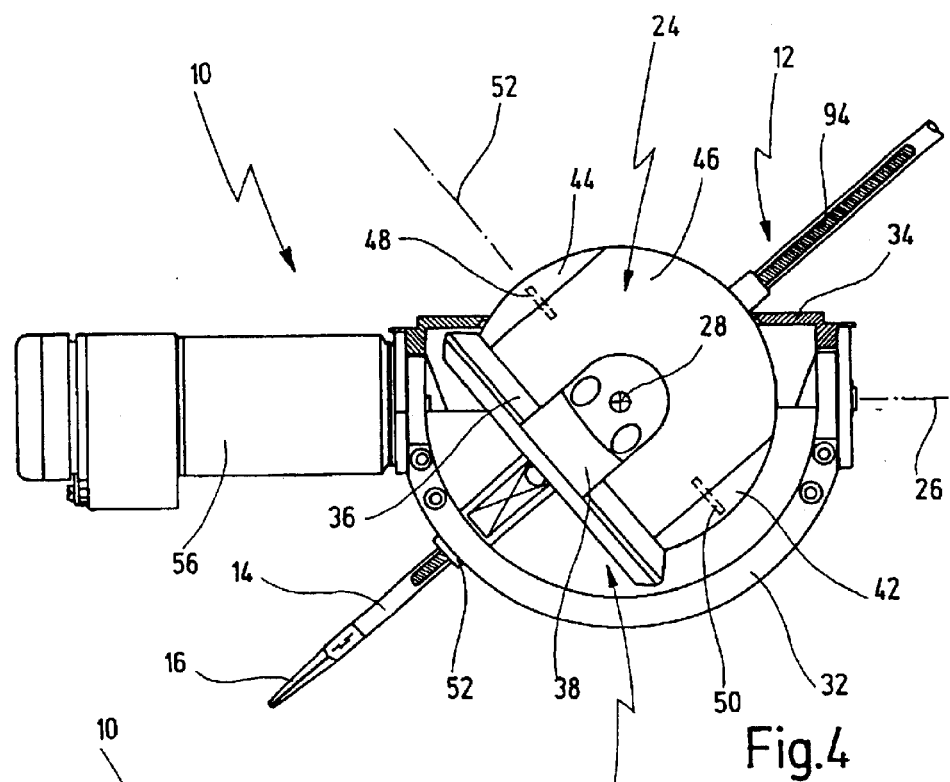
FIG. 4 shows a side view of the simulator apparatus in FIGS. 1 to 3 with partial omissions and partly in section.
Figure 5:
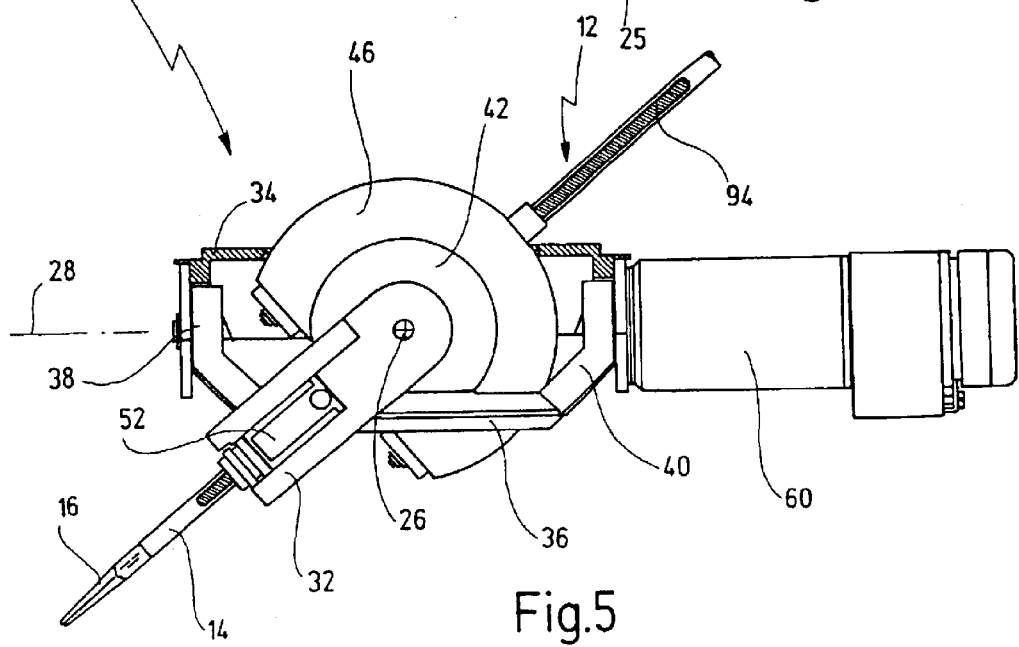
FIG. 5 shows a further side view of the simulator apparatus in FIGS. 1 to 4, the side view being rotated by approximately 90° by comparison with FIG. 4.

Starting from FIG. 2, the tilted position illustrated in FIG. 3 is reached by having swiveled the instrument 12 in a direction into the plane of the drawing about the first swivel axis 26. In this case, the annular element 36 has not been moved, but the spherical element 48 has moved relative to the annular element 36.

In order in the case of the above described movements of the instrument 12 to simulate a force resistance that is to be overcome, for example, by the elasticity, stiffness of a simulated tissue when handling the instrument 12, the above mentioned movements can be counteracted by a software-aided computer-controlled drive of the actuators 56 and 60, such that the operator feels a "real" force resistance as if he is carrying out the same actions on a patient.

The position detection sensors 58 and 62 continuously detect in real time the current angular positions of the instrument 12 about the first swivel axis 26 and second swivel axis 28, and the actuators 56 and 60 are driven for force feedback in real time on the basis of these data and the tissue data stored in the computer.

It goes without saying that the instrument 12 can be swiveled not only sequentially about the first swivel axis 26 and the second swivel axis 28, but also simultaneously in any desired solid angle directions about both swivel axes 26 and 28.

It follows from the above that the actuators 56 and 60, as well as the position detection sensors 58 and 62 were not also moved during the movements of the instrument 12 and the movements, associated therewith, of the annular element 36, the bow-shaped element 32 and the spherical element 46, and so the holding device 24 is of very low torque and the cardanic suspension 25 constitutes a very compact design for implementing the previously named degrees of freedom.

In accordance with a further aspect, the simulator apparatus 10 has a gear arrangement 70, which will be described in more detail below with reference to FIGS. 6 to 8.

The gear arrangement 70 is a component of the holding device 24 for the instrument 12, it being possible to use the gear arrangement 70 to simulate further degrees of freedom of movement for the instrument 12 with force feedback. These further degrees of freedom are a degree of freedom of a rotary movement of the instrument 12 about the longitudinal axis of the shaft 14, and a further degree of freedom of a translatory movement of the instrument 12 in a direction of the shaft 14.

Figures 6, 8:
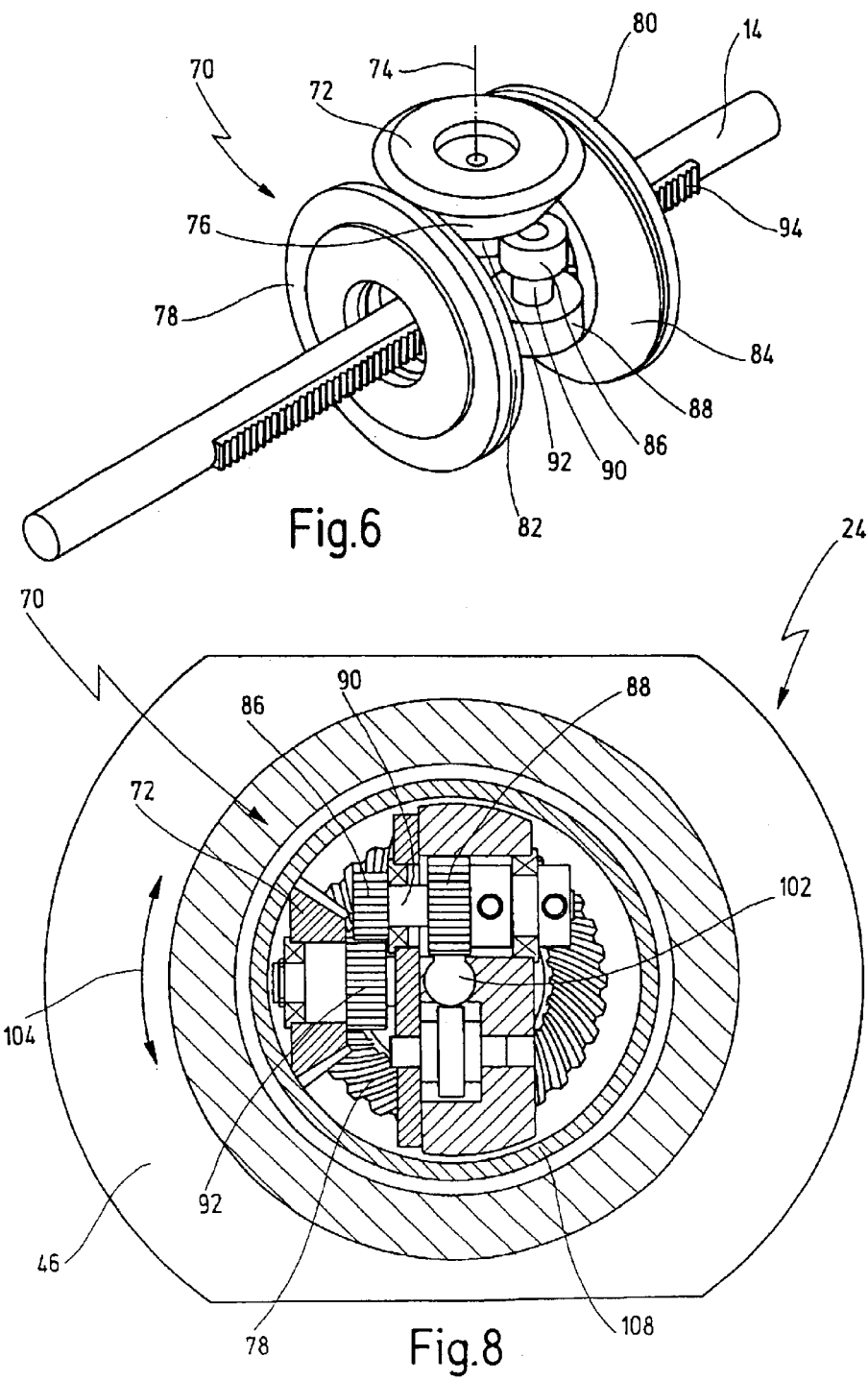
FIG. 6 shows a gear arrangement, present in the simulator apparatus in FIGS. 1 to 5, in perspective illustration to an enlarged scale.
FIG. 8 shows a section along the line VIII—VIII in FIG. 7.
Figure 7:
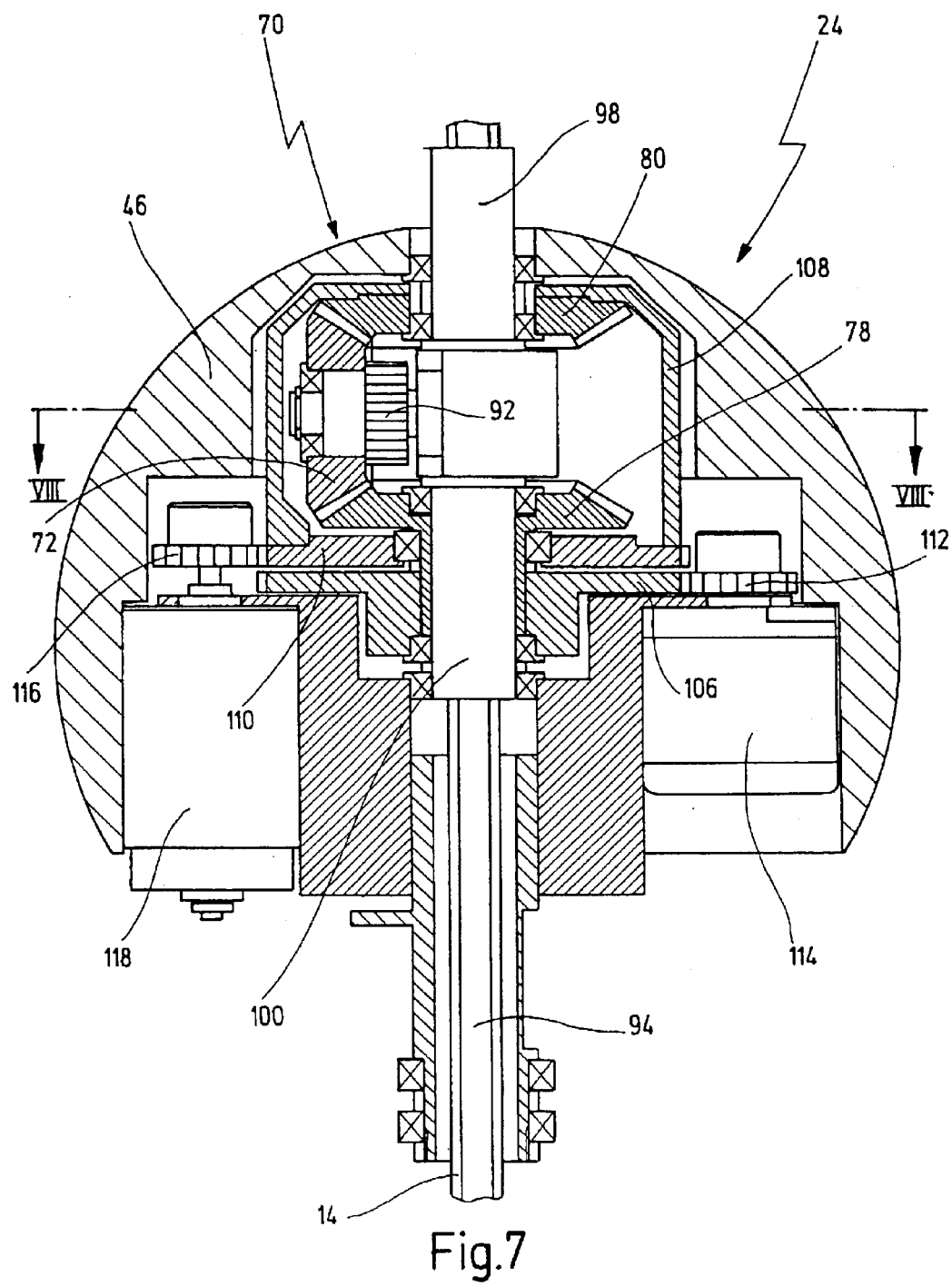
FIG. 7 shows a detail of the simulator apparatus in FIGS. 1 to 5 in a longitudinal section to an enlarged scale.

As emerges from FIGS. 7 and 8, the gear arrangement 70 provided for simulating the two above named degrees of freedom with force feedback is arranged as a whole in the spherical element 46 of the cardanic suspension 25. The gear arrangement 70 is illustrated in perspective in FIG. 6 to a large scale without the spherical element 46.

Firstly, the gear arrangement 70 has a first bevel gear 72. The first bevel gear 72 can be rotated about an axis of rotation 74 running transverse to the shaft 14. The first bevel gear 72 has a tooth system (not illustrated in FIG. 6) on a frustoconical circumferential surface 76. The frustoconical surface 76 can also be designed as a friction surface instead of a tooth system.

The gear arrangement 70 further has a second bevel gear 78 and a third bevel gear 80, the second bevel gear 78 and the third bevel gear 80 being arranged on either side of the first bevel gear 72. The second bevel gear 78 and the third bevel gear 80 are arranged around the shaft 14 of the instrument 12 in a fashion coaxial therewith. The bevel gears 78 and 80 can therefore be rotated about the longitudinal axis of the shaft 14. The axes of rotation of the bevel gears 78 and 80 run perpendicular to the axis of rotation of the bevel gear 72.

The second bevel gear 78 has a frustoconical surface 82, and the third bevel gear 84 has a frustoconical surface 84, the frustoconical surfaces 82 and 84 being in rolling engagement with the frustoconical surface 76 of the first bevel gear 72. The frustoconical surfaces 82 and 84 correspondingly have tooth systems, or are constructed as friction surfaces.

While the second bevel gear 78 and the third bevel gear 80 are not connected to the shaft 14, the first bevel gear 72 is connected to the shaft 14 via a pinion arrangement that has a first pinion 86 and a second pinion 88. The first pinion 86 is connected securely in terms of rotation to the second pinion 88 via a shaft 90. An axis of rotation of the arrangement composed of the first pinion 86, the shaft 90 and the second pinion 88 runs parallel to the axis of rotation 74 of the first bevel gear 72.

The first bevel gear 72 has a spur gear 92 that engages with the first pinion 86 in a meshing fashion.

By contrast, the second pinion 88 engages with a tooth system 94 extending along the shaft 14.

The spur gear 92 can be constructed as one piece with the first bevel gear 72, or be connected securely in terms of rotation to the latter as a separate part.

In accordance with FIGS. 7 and 8, the gear arrangement 70 is arranged inside the spherical element 46 in a cutout 96.

The shaft 14 of the instrument 12 is guided by cylindrical sleeves 98 and 100 through the gear arrangement 70. Because of the tooth system 94 provided on the shaft 14, the shaft 14 has a key-like profile in cross section, the gear arrangement having a keyhole-like passage 102 (FIG. 8) which is complementary correspondingly thereto. The first bevel gear 72 is connected in this way to the shaft 14 securely in terms of rotation via the pinions 86 and 88, that is to say given a rotation of the shaft 14 about its longitudinal axis the first bevel gear 72 in the spherical element 48 is rotated about the longitudinal axis of the shaft 14 in accordance with a double arrow 104, depending on the direction of rotation of the shaft.

The second bevel gear 78 is connected securely in terms of rotation to an annular flange 106. The third bevel gear 80 is connected securely in terms of rotation to a cylindrically constructed box 108 that, in turn, is connected securely in terms of rotation to a further annular flange 110. The annular flange 106, which is connected securely in terms of rotation to the second bevel gear 78, has on its outer circumference a tooth system that meshes with a pinion 112 that is connected to the output shank of an actuator 114, for example a DC motor, to the output shank thereof.

The annular flange 110, which is connected securely in terms of rotation to the third bevel gear 80 via the box 108, likewise has on its outer circumference a tooth system that meshes with a pinion 114 that is connected on the output side to an actuator 118.

The actuators 114 and 118 serve as force feedback for the degree of freedom of the translatory movement in direction of the shaft, and as force feedback for the degree of freedom of the rotary movement of the instrument 12 about the shaft 14, as will be described in yet more detail hereafter.

The mode of operation of the gear arrangement 70 is as follows, the mode of operation firstly being described without force feedback.

If the instrument 12 is rotated about the longitudinal axis of the shaft 14, because of the keyhole-like connection to the keyhole-like passage 102 the shaft 14 corotates the pinions 88 and 86, and thus the first bevel gear 72 in the direction of rotation of the shaft 14. The first bevel gear 72 is mounted in a floating fashion inside the box 108. In the event of this rotation of the first bevel gear 72 about the longitudinal axis of the shaft 14, the first bevel gear 72 does not rotate about its axis of rotation 74. By contrast, the bevel gear 72 rotating about the longitudinal axis of the shaft 14 sets the second bevel gear 78 and the third bevel gear 80 rotating in mutually identical directions.

If the instrument 12 is displaced along the direction of the shaft 14 in the holding device 24, the tooth system 94 sets the pinion 88 and thus the pinion 86 in a rotation that causes a corresponding rotation of the bevel gear 72 about the axis of rotation 74 without, as previously described, the bevel gear 72 rotating about the longitudinal axis of the shaft 14. Because of the rotation of the first bevel gear 72 about the axis of rotation 74, the second bevel gear 78 and the third bevel gear 80 are now set rotating in mutually opposite directions.

In order now to bring about a force feedback to the degree of freedom of the rotation of the instrument 12 about the longitudinal axis of the shaft 14, the actuators 114 and 118 must retard the second bevel gear 78 and the third bevel gear 80 in the same direction of rotation relative to one another with the same torque.

In order to bring about a force feedback to the degree of freedom of the translatory movement of the instrument 12 in the direction of the shaft 14, because of the oppositely directed rotary movement of the second bevel gear 78 relative to the third bevel gear 80 the actuators 118 and 114 must correspondingly retard the bevel gears 78 and 80 in opposite directions, as far as possible with the same torques, in order thereby to oppose this degree of freedom with a force feedback.

The gear arrangement 70 has rendered it possible not to require the actuators 114 and 118 also to be moved. This results in an implementation also of these two degrees of freedom of the instrument 12 that is of particularly low torque, and in a particularly compact design, since it is necessary, as far as moving parts are concerned, only for the bevel gears 72, 78 and 80 and smaller pinions to be moved.

It goes without saying that movements of the instrument 12 in the direction of the shank 14 and movements of the instrument 12 about the longitudinal axis of the shaft 14 can be performed in a fashion superimposed on one another simultaneously.

Furthermore, position detection sensors (not illustrated individually), for example in the form of angle encoders, are provided for the degrees of freedom of the rotary movement about the longitudinal axis of the shaft 14 and the translatory movement in the direction of the shaft 14 in order to be able to carry out computer-aided simulation with the aid of appropriate software.

It follows from the above description that the simulator apparatus 10 renders possible a simulation of four degrees of freedom of movement of the instrument 12, all the degrees of freedom being provided with force feedback.

A fifth degree of freedom of movement consists in the case of the instrument 12 in the movement of the moveable grip part 20. Force feedback can also be provided for this degree of freedom of movement, for example by connecting at the moveable grip part a Bowden cable (not illustrated) that is connected to an actuator (not illustrated) in the form of a DC motor. Appropriate position detection sensors detect the current position of the moveable grip part for the purpose of real time calculation of the force feedback.

The compact design of the simulator apparatus 10 renders it possible to use three such apparatuses in close proximity, one simulator apparatus, for example an endoscope, and two further apparatuses respectively accommodating a tool. The compact design of the simulator apparatus 10 even renders it possible in this case for the instrument tips to be able to touch one another, as is the case with real surgical operations.

Via a measured data acquisition and control card the simulator apparatus 10 is connected (in a way not illustrated) in a unit to a central processor. Stored in a program in the measured data acquisition and control card are the kinematics for determining the position of the instrument tip, of the tool 16 in the case of the instrument 12, and the inverse kinematics for the distribution of the force and torque components at the instrument tip, as well as a software for the control.

The previously described actuators are to be understood only by way of example, it also being possible to implement such motors by means of hollow-shank motors. Moreover, instead of one axial hollow-shank motor acting coaxially, it is possible for a plurality of motors to act coaxially on the bevel gears 78 and 80.

What is claimed is:

1. A simulator apparatus with at least two degrees of freedom of movement for an instrument that has an elongated shaft defining a longitudinal axis, said simulator apparatus comprising:

a holding device for said instrument, said holding device being designed such that said instrument has at least a first degree of freedom of rotary movement about said longitudinal axis of said shaft and at least a second degree of freedom of translatory movement in the direction of said longitudinal axis of said shaft, said holding device having a gear arrangement for said first and second degrees of freedom, wherein said gear arrangement has a first bevel gear, which is connected to said shaft and corotates with the latter about said longitudinal axis thereof, and has a second and a third bevel gear which are arranged on either side of said first bevel gear and are in rolling engagement therewith.

2. The simulator apparatus of claim 1, wherein said first bevel gear is in rolling engagement with said shaft via at least one pinion with the aid of a tooth system extending along said shaft.

3. The simulator apparatus of claim 1, wherein said second and said third bevel gears are arranged concentrically with said shaft.

4. The simulator apparatus of claim 1, wherein said first degree of freedom and said second degree of freedom are provided with force feedback.

5. The simulator apparatus of claim 4, wherein said second and third bevel gears are connected in each case to at least one actuator for said force feedback.

6. The simulator apparatus of claim 1, wherein said holding device further has a cardanic suspension such that said instrument has a third degree of freedom of a swiveling movement about a first swivel axis, and a fourth degree of freedom of a swiveling movement about a second swivel axis, running perpendicular to said first swivel axis.

7. The simulator apparatus of claim 6, wherein said cardanic suspension is formed by a bow-shaped element that can be swiveled about said first swivel axis, and an annular element that can swivel about said second swivel axis, said instrument being guided on said bow-shaped element.

8. The simulator apparatus of claim 7, wherein there are fastened on said annular element two mutually opposite seats, arranged offset by approximately 90° with reference to said second swivel axis, for a spherical element through which the shaft is passed, said spherical element in said seats being held such that it can rotate relative to said seats about an axis of rotation passing through both seats, in such that it is immobile with reference to said seats perpendicular to said axis of rotation.

9. The simulator apparatus of claim 8, wherein said gear arrangement is arranged in said spherical element.

10. The simulator apparatus of claim 1, wherein said holding device further has a cardanic suspension such that said instrument has a third degree of freedom of a swiveling movement about a first swivel axis, and a fourth degree of freedom of a swiveling movement about a second swivel axis, running perpendicular to said first swivel axis, and wherein said third and said fourth degrees of freedom are provided with force feedback.

11. The simulator apparatus of claim 10, wherein at least one actuator is provided in each case for said force feedback to said third and fourth degrees of freedom.

12. The simulator apparatus of claim 1, wherein each case one-position detection sensor is provided for determining the position of said instrument for at least one degree of freedom.

13. The simulator apparatus of claim 1, wherein said instrument has a moveable-operating device, and said moveable operating device is equipped with force feedback.

14. The simulator apparatus of claim 1, wherein it is used for simulating a minimally invasive intervention in the human or animal body.

* * * * *